United States Patent
Kaneko et al.

(10) Patent No.: US 11,657,624 B2
(45) Date of Patent: May 23, 2023

(54) IMAGE PROCESSOR AND IMAGE PROCESSING METHOD FOR PARKING FRAME ESTIMATION ON A ROAD SURFACE

(71) Applicant: Faurecia Clarion Electronics Co., Ltd., Saitama (JP)

(72) Inventors: Takayuki Kaneko, Saitama (JP); Shunsuke Kondo, Saitama (JP); Mamoru Kubota, Sagamihara (JP)

(73) Assignee: FAURECIA CLARION ELECTRONICS CO., LTD., Saitama (JP)

( * ) Notice: Subject to any disclaimer, the term of this patent is extended or adjusted under 35 U.S.C. 154(b) by 171 days.

(21) Appl. No.: 17/185,336

(22) Filed: Feb. 25, 2021

(65) Prior Publication Data

US 2021/0271903 A1 Sep. 2, 2021

(30) Foreign Application Priority Data

Feb. 27, 2020 (JP) .............................. JP2020-031993

(51) Int. Cl.
*G06K 9/00* (2022.01)
*G06V 20/58* (2022.01)
(Continued)

(52) U.S. Cl.
CPC .............. *G06V 20/586* (2022.01); *B60R 1/00* (2013.01); *G06F 18/22* (2023.01); *G06T 11/203* (2013.01);
(Continued)

(58) Field of Classification Search
CPC ................ B60R 1/00; B60R 2300/301; B60R 2300/302; B60R 2300/806; G06K 9/6215; G06T 11/203; H04N 5/272
See application file for complete search history.

(56) References Cited

U.S. PATENT DOCUMENTS 7,069,128 B2 * 6/2006 Iwama ............... B62D 15/0245
                                                    348/148
7,205,905 B2 * 4/2007 Gotzig ................... B60Q 9/006
                                                    414/253
(Continued)

FOREIGN PATENT DOCUMENTS

CN   103358993   10/2013
CN   104812646   7/2015
(Continued)

OTHER PUBLICATIONS

Office Action dated Jun. 30, 2022 in corresponding Chinese Patent Application No. 202110198808.5, with English language translation.

(Continued)

*Primary Examiner* — Terrell M Robinson
(74) *Attorney, Agent, or Firm* — Wenderoth, Lind & Ponack, L.L.P.

(57) ABSTRACT

An image processor includes a line extraction portion configured to extract a line from an image generated from a vehicle surrounding image captured at a predetermined timing, a tracking determination portion configured to determine whether the extracted line fulfills a predetermined condition or not, a comparing portion configured to compare the line that is determined as fulfilling the predetermined condition with a line that is extracted by the line extraction portion from another image generated from another vehicle surrounding image captured at a predetermined timing in the past to obtain degrees of similarity and coincidence thereof, a parking area line determination portion configured to determine the line as a parking area line when the degrees of similarity and coincidence are equal to or more than a given value, and a parking frame setting portion configured to set (Continued)

a parking frame using the line determined as the parking area line.

5 Claims, 8 Drawing Sheets

(51) Int. Cl.
    *B60R 1/00*      (2022.01)
    *G06T 11/20*     (2006.01)
    *H04N 5/272*     (2006.01)
    *G06F 18/22*     (2023.01)
    *G06V 20/56*     (2022.01)

(52) U.S. Cl.
    CPC ........... *G06V 20/588* (2022.01); *H04N 5/272* (2013.01); *B60R 2300/301* (2013.01); *B60R 2300/302* (2013.01); *B60R 2300/806* (2013.01)

(56) References Cited

U.S. PATENT DOCUMENTS

| | | | |
|---|---|---|---|
| 2008/0266137 A1* | 10/2008 | Son | B62D 15/0275 348/148 |
| 2010/0049402 A1* | 2/2010 | Tanaka | B60R 1/00 701/41 |
| 2013/0265429 A1 | 10/2013 | Yoon et al. | |
| 2014/0355822 A1 | 12/2014 | Choi et al. | |
| 2015/0165972 A1* | 6/2015 | Takemae | G06V 20/588 348/148 |
| 2015/0310285 A1 | 10/2015 | Ogata et al. | |
| 2015/0317526 A1 | 11/2015 | Muramatsu et al. | |
| 2015/0339535 A1 | 11/2015 | Utagawa et al. | |
| 2016/0039409 A1 | 2/2016 | Hayakawa et al. | |
| 2017/0177956 A1 | 6/2017 | Zhang | |
| 2017/0203769 A1 | 7/2017 | Ohta | |
| 2021/0056848 A1 | 2/2021 | Tsuge et al. | |

FOREIGN PATENT DOCUMENTS

| | | |
|---|---|---|
| CN | 104822566 | 8/2015 |
| CN | 104823214 | 8/2015 |
| CN | 104871204 | 8/2015 |
| CN | 105160322 | 12/2015 |
| CN | 106373426 | 2/2017 |
| CN | 106660556 | 5/2017 |
| CN | 106897655 | 6/2017 |
| CN | 109544979 | 3/2019 |
| CN | 109923586 | 6/2019 |
| JP | 3-99952 | 4/1991 |
| JP | 2003-118522 | 4/2003 |
| JP | 2016-16681 | 2/2016 |
| WO | 2019/187720 | 10/2019 |

OTHER PUBLICATIONS

Extended European Search Report dated Jul. 15, 2021 in European Patent Application No. 21159758.8.

* cited by examiner

IMAGE PROCESSOR AND IMAGE PROCESSING METHOD FOR PARKING FRAME ESTIMATION ON A ROAD SURFACE

CROSS-REFERENCE TO RELATED APPLICATION

The present application is based on and claims priority from Japanese patent application No. 2020-031993 filed on Feb. 27, 2020, the disclosure of which is hereby incorporated by reference in its entirety.

FIELD OF THE INVENTION

A present disclosure relates to an image processor and an image processing method that estimate a parking frame on a road surface based on an image signal output from an imaging device that captures the road surface around a vehicle.

BACKGROUND

A parking assist device has been used to park a vehicle in a predetermined parking space. Such a parking assist device automatically detects a target parking frame to automatically park the vehicle (see JP2016-16681A, for example). The art disclosed in JP2016-16681A detects parking area lines from an image captured by an imaging device provided in the vehicle and also detects an available parking frame based on the detected parking area lines. At this time, the parking assist device determines whether the parking frame is an angle parking frame, a perpendicular or side-by-side parking frame, or a parallel parking frame based on extending angles of the parking area lines, distances to adjacent parking area lines, or the like.

The determination for the angle parking frame is performed based on the continuity of the angle parking frames. Specifically, in the case that a plurality of angle parking frames is continuously detected from a predetermined parking area, a parking lot is determined as including the angle parking frames. On the other hand, in the case that only one of the detected parking frames is determined as the angle parking frame, such a parking frame may be mistakenly detected as the angle parking frame even though the parking frame is either the perpendicular parking frames or the parallel parking frames.

The detection of the parking area lines and/or the parking frames is dynamically performed in accordance with the movement of the vehicle. Accordingly, depending on the detection timing, the parking area lines may not be detected, and/or lines other than the parking area lines may be detected as the parking area lines due to other parked vehicles, obstacles, relatively large shadows of obstacles such as the host vehicle, walls, fences, shadows of leaves of trees, or reflection of light by road lighting, or the like. This may affect the detection of the continuity of the angle parking frames, or the perpendicular parking frames or the parallel parking frames may be mistakenly detected as the angle parking frames, which may affect the detection of the parking frames.

Therefore, an object of the present disclosure is to provide an image processor and an image processing method capable of detecting parking area lines and parking frames with high accuracy.

SUMMARY

An image processor of the present disclosure includes a line extraction portion that is configured to extract a line from an image generated from a surrounding image of a vehicle captured by an imaging device at predetermined timing; a tracking determination portion that is configured to determine whether the line extracted by the line extraction portion fulfills a predetermined condition or not; a comparing portion that is configured to compare the line that is determined as fulfilling the predetermined condition by the tracking determination portion with a line that is extracted by the line extraction portion from an image generated from a surrounding image of the vehicle captured by the imaging device at a predetermined timing in past to obtain degrees of similarity and coincidence thereof; a parking area line determination portion that is configured to determine the line as a parking area line when the obtained degrees of similarity and coincidence are equal to or more than a given value; and a parking frame setting portion that is configured to set a parking frame by using the line that is determined as the parking area line by the parking area line determination portion.

An image processing method includes a line extraction step for extracting a line from an image generated from a surrounding image of a vehicle captured by an imaging device at predetermined timing; a tracking determination step for determining whether the line extracted in the line extraction step fulfills a predetermined condition or not; a comparing step for comparing the line that is determined as fulfilling the predetermined condition in the tracking determination step with a line that is extracted in the line extraction step from an image generated from a surrounding image of the vehicle captured by the imaging device at a predetermined timing in past to obtain degrees of similarity and coincidence thereof; a parking area line determination step for determining the line as a parking area line when the obtained degrees of similarity and coincidence are equal to or more than a given value; and a parking frame setting step for setting a parking frame by using the line that is determined as the parking area line by the parking area line determination step.

DETAILED DESCRIPTION

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

Figure 1:
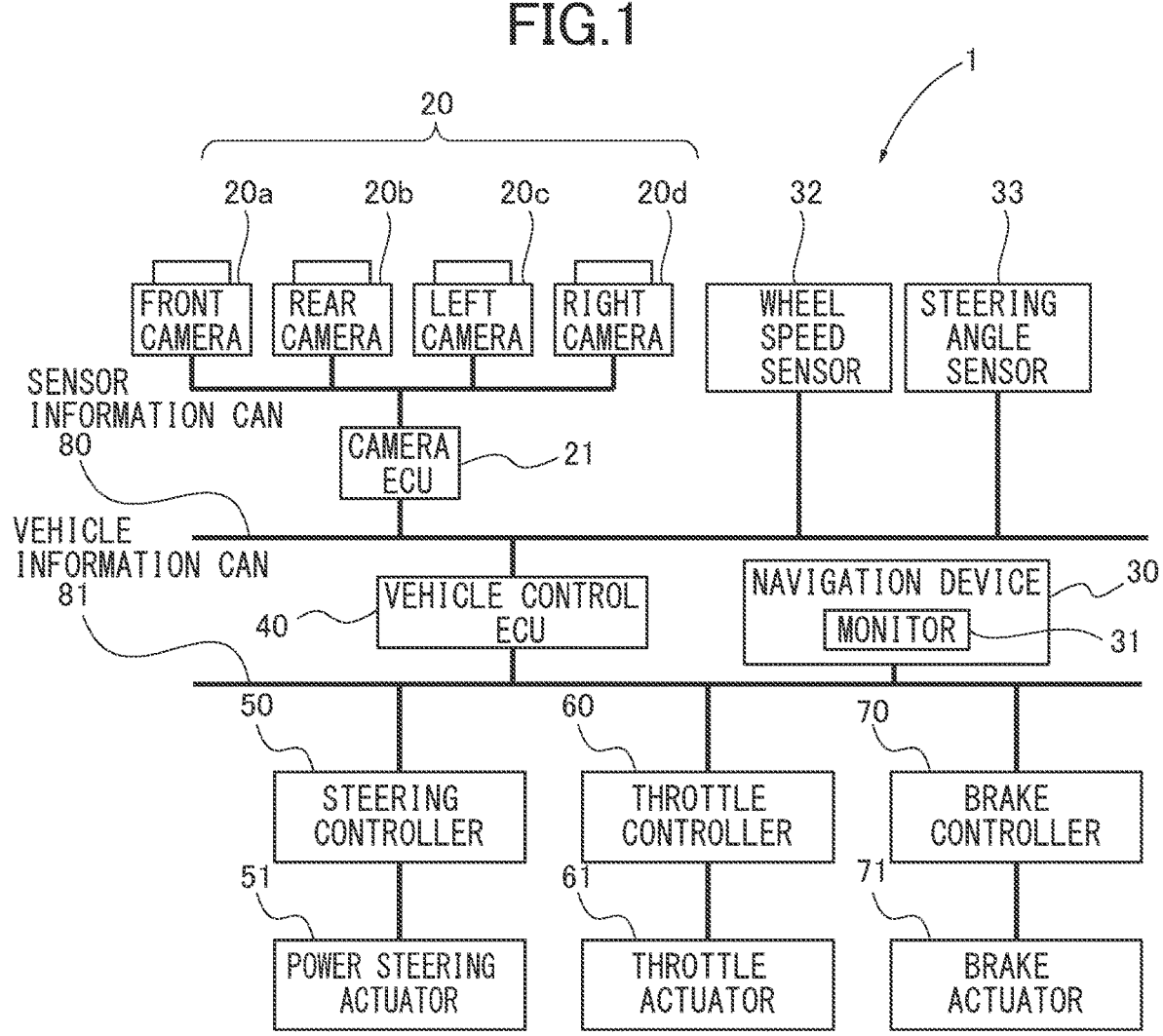
FIG. 1 is a block diagram illustrating a schematic configuration of a parking assist device to which an image processor of an embodiment of the present disclosure is applied.
Figure 2:
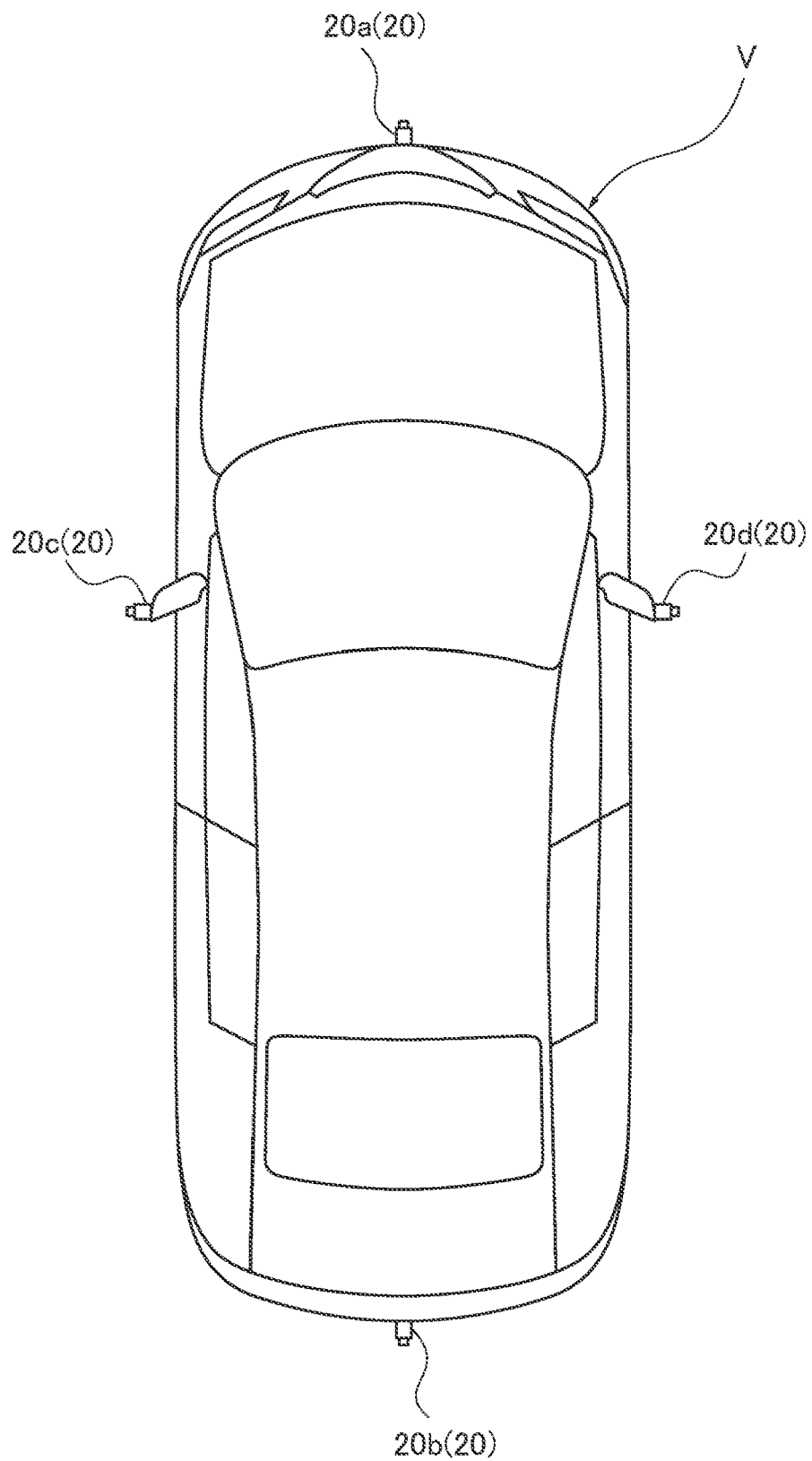
FIG. 2 is a view illustrating an example of positions of imaging devices of the parking assist device of the embodiment.

Hereinafter, an embodiment of the present disclosure will be described with reference to the drawings. FIG. 1 is a block diagram illustrating a schematic configuration of a parking assist device to which an image processor of an embodiment of the present disclosure is applied. FIG. 2 is a view illustrating an example of positions of imaging devices of the parking assist device.

As shown in FIG. 1, a vehicle V (see FIG. 2) is provided with a parking assist device 1 that performs a parking assist operation. More specifically, the parking assist device 1 recognizes a parking frame in which the vehicle V can be parked. The parking assist device 1 controls the vehicle V such that the vehicle V is parked in the recognized parking frame.

As shown in FIG. 2, a plurality of small cameras (imaging devices) is mounted on front, rear, right, and left portions of the vehicle V, respectively. More specifically, a front camera 20a facing the front of the vehicle V is mounted on a front bumper or a front grille of the vehicle V to face. A rear camera 20b facing the rear of the vehicle V is mounted on a rear bumper or a rear garnish of the vehicle V. A left camera 20c facing the left side of the vehicle V is mounted on a left door mirror of the vehicle V. A right camera 20d facing the right side of the vehicle V is mounted on a right door mirror of the vehicle V.

Each of the front camera 20a, the rear camera 20b, the left camera 20c, and the right camera 20d is provided with a wide-angle lens or a fisheye lens capable of observing a wide range. A region including a road surface around the vehicle V can be completely observed by the four cameras 20a to 20d. The cameras 20a to 20d constitute the imaging devices that image the road surface around the vehicle V. In the following description, the respective cameras (imaging devices) 20a to 20d are simply referred to as a camera 20 without distinguishing the respective cameras (imaging devices) 20a to 20d.

Referring to FIG. 1, the parking assist device 1 includes the front camera 20a, the rear camera 20b, the left camera 20c, the right camera 20d, a camera ECU 21, a navigation device 30, a wheel speed sensor 32, and a steering angle sensor 33.

The camera ECU 21 includes a microcomputer, as a main body, including a Central Processing Unit (CPU), a Read-Only Memory (ROM), a Random Access Memory (RAM), a flash memory, or the like. The camera ECU 21 controls the camera 20 and performs a creation process for creating an overhead image, a detection process for detecting a parking frame, and a determination process for determining whether or not the vehicle V can be parked in the detected parking frame by using information detected by the camera 20.

The navigation device (display device) 30 includes a monitor 31 having an image display function. The navigation device 30 includes a memory that stores, for example, map data for guiding a route. The navigation device 30 guides a route to a destination set by an operator of the navigation device 30 based on the map data and a present position of the vehicle V detected by a GPS device (not shown), for example. Various images during a route guidance operation are displayed on the monitor 31.

The wheel speed sensor 32 detects the wheel speed of the vehicle V. The information (wheel speed) detected by the wheel speed sensor 32 is input to a vehicle control ECU 40.

The steering angle sensor 33 detects a steering angle of the vehicle V. The steering angle sensor 33 outputs a rotation angle from a neutral position (0 degrees) as the steering angle. The steering angle when the vehicle V travels straight is set as the neutral position (0 degrees). The information (steering angle) detected by the steering angle sensor 33 is input to the vehicle control ECU 40.

The parking assist device 1 further includes the vehicle control ECU 40, a steering controller 50, a throttle controller 60, and a brake controller 70.

The vehicle control ECU 40 includes a microcomputer, as a main body, having a Central Processing Unit (CPU), a Read-Only Memory (ROM), a Random Access Memory (RAM), and a flash memory. The vehicle control ECU 40 executes various processes that assist the parking of the vehicle V based on the various information input from the camera ECU 21, the wheel speed sensor 32, and the steering angle sensor 33.

More specifically, when a driver starts the parking assist device 1 by turning on an automatic parking start switch or button (not shown), for example, the vehicle control ECU 40 executes an automatic parking process for automatically parking the vehicle V in a parking frame determined as an available parking frame by the camera ECU 21.

The steering controller 50 controls the steering angle of the vehicle V by driving a power steering actuator 51 based on the vehicle control information determined by the vehicle control ECU 40.

The throttle controller 60 controls the throttle of the vehicle V by driving a throttle actuator 61 based on the vehicle control information determined by the vehicle control ECU 40.

The brake controller 70 controls the brake of the vehicle V by driving a brake actuator 71 based on the vehicle control information determined by the vehicle control ECU 40.

The camera ECU 21, the wheel speed sensor 32, the steering angle sensor 33, and the vehicle control ECU 40 are connected by a sensor information Controller Area Network (CAN) (registered trademark) 80 which is an interior Local Area Network (LAN).

The steering controller 50, the throttle controller 60, the brake controller 70, and the vehicle control ECU 40 are connected by a vehicle information CAN 81 which is the interior LAN.

In the parking assist device 1 having the above configuration, the image processor 100 of the embodiment is mainly constituted by the camera ECU 21.

Figure 3:
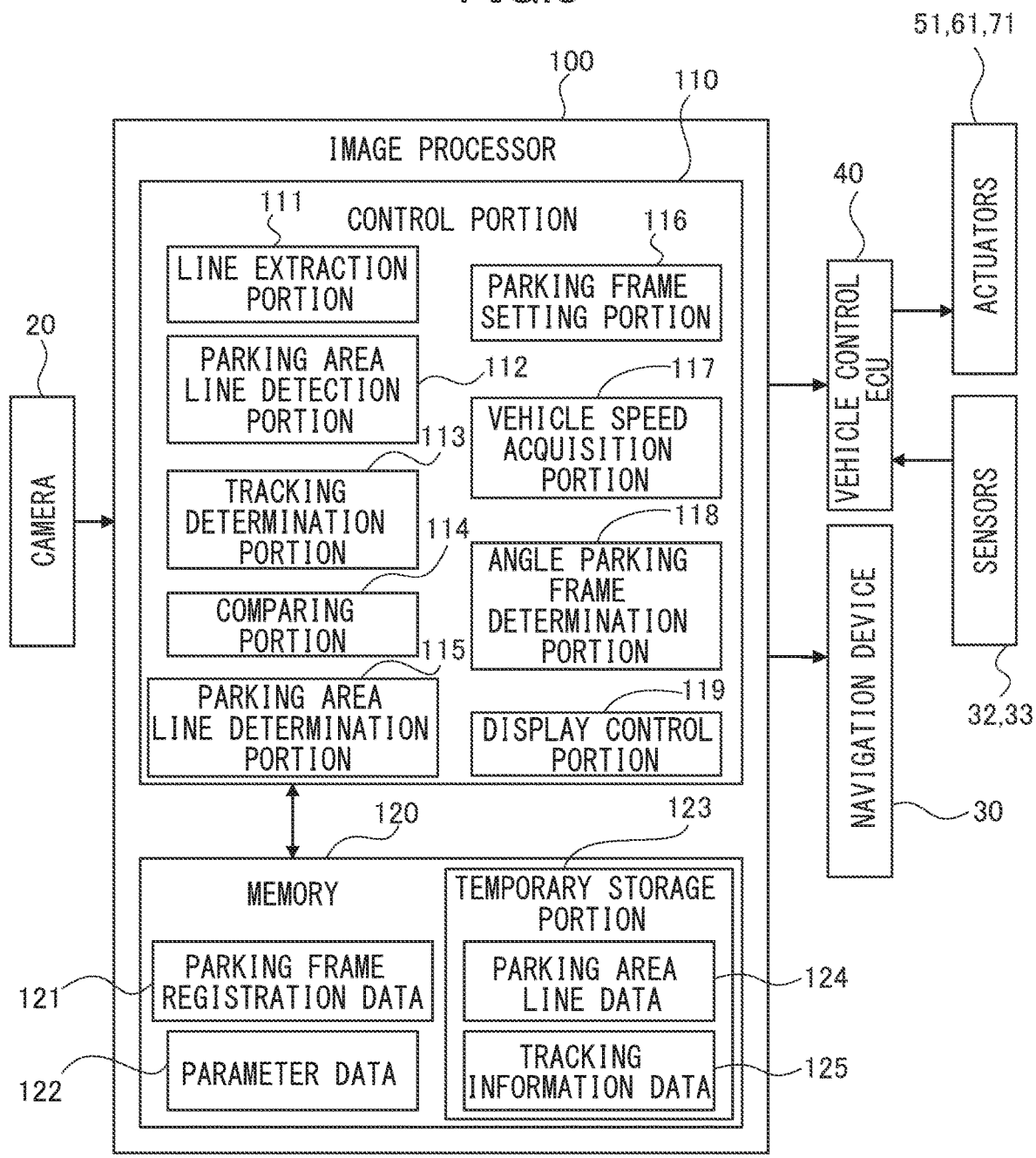
FIG. 3 is a functional block diagram illustrating a schematic configuration of the image processor of the embodiment.

The functional configuration of the image processor will be described hereinafter. FIG. 3 is a functional block diagram illustrating a schematic configuration of the image processor 100 of the embodiment. The image processor 100 of the embodiment includes a control portion 110 and a memory 120. The control portion 110 is mainly constituted by the CPU of the camera ECU 21, and the memory 120 is mainly constituted by the ROM, the RAM, the flash memory, and the like of the camera ECU 21.

The control portion 110 controls the entire image processor 100. In addition, the control portion 110 transmits information required for the automatic parking process (for example, positions and shapes of parking spaces and parking frames) to the vehicle control ECU 40 so that the vehicle control ECU 40 executes the automatic parking process for automatically parking the vehicle V in the parking frame determined as an available parking frame based on the parking space and the parking area lines that divide the parking space detected and estimated by a line extraction portion 111, a parking area line detection portion 112, a tracking determination portion 113, a comparing portion 114, a parking area line determination portion 115, a parking frame setting portion 116, and the like which will be described later.

The vehicle control ECU 40 controls the power steering actuator 51, the throttle actuator 61, and the brake actuator 71 (simply recited as actuators in FIG. 3) based on the information provided from the control portion 110 and the information detected by the wheel speed sensor 32 and the steering angle sensor 33 (simply recited as sensors in FIG. 3).

The control portion 110 includes a calculation element represented by an integrated circuit such as a programmable logic device and an ASIC. The programmable logic device includes a CPU and an FPGA.

The memory 120 of the image processor 100 stores a control program (not shown). This control program is executed by the control portion 110 at the startup of the image processor 100. The image processor 100 includes a functional configuration as illustrated in FIG. 3. In particular, it is preferable for the image processor 100 of the present embodiment to have a calculation element capable of calculating at high speed, for example, an FPGA since the image processor 100 executes a high-speed image process as described below.

As shown in FIG. 3, the control portion 110 includes the line extraction portion 111, the parking area line detection portion 112, the tracking determination portion 113, the comparing portion 114, the parking area line determination portion 115, the parking frame setting portion 116, a vehicle speed acquisition portion 117, an angle parking frame determination portion 118, and a display control portion 119.

Figure 5:
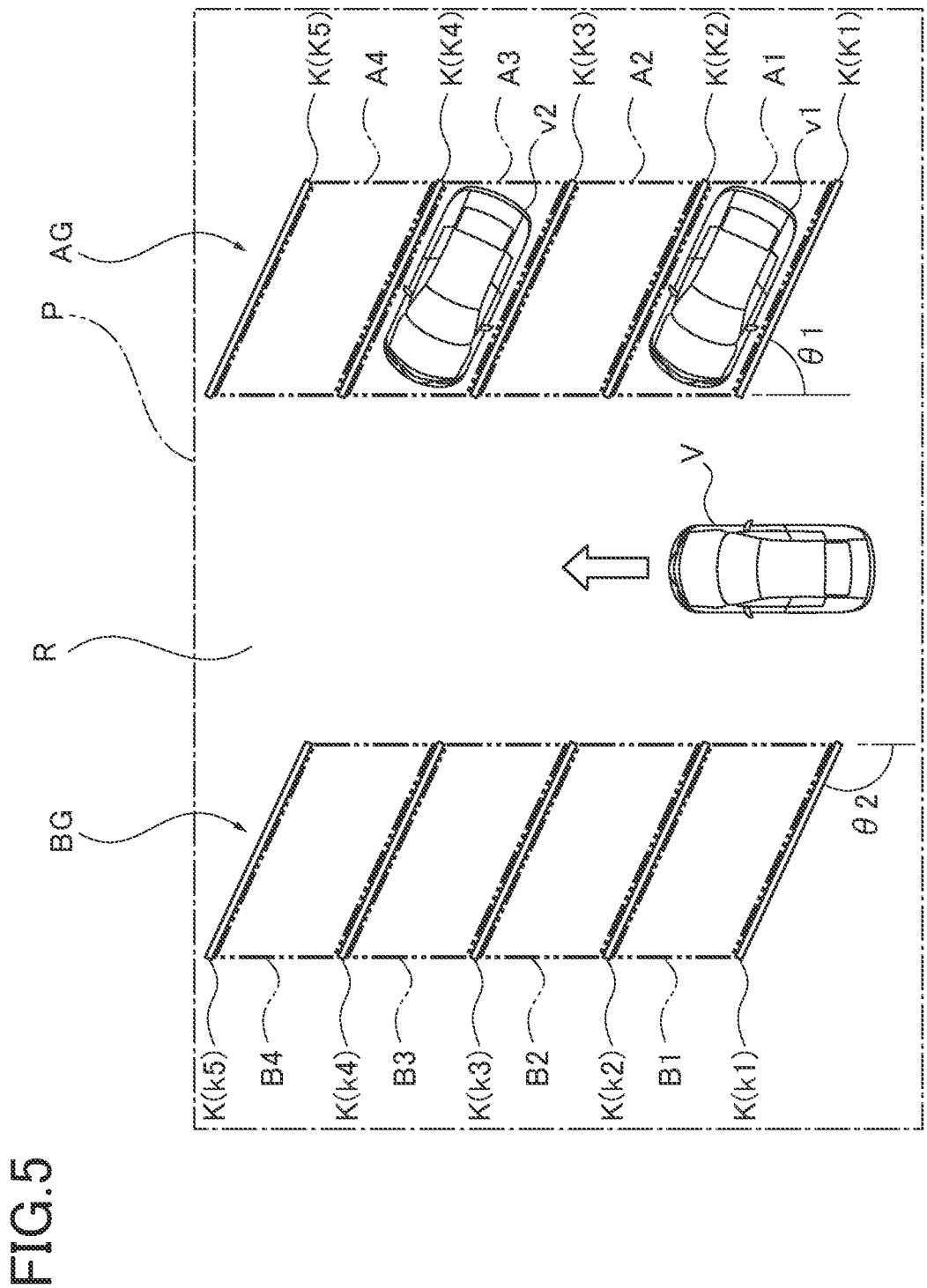
FIG. 5 is a view illustrating an example of an operation of the image processor of the embodiment and an example of parking area lines drawn on a road surface of a parking lot.

The line extraction portion 111 detects edges of a parking area line K on a road surface R of a parking lot P, for example, by the edge detection based on the image signal output from the camera 20 that captures the road surface R around the vehicle V, and extracts the lines based on the detected edges. The parking area line K is drawn as a borderline (straight line) that divides a parking area mainly on the road surface R. FIG. 5 illustrates an example of the vehicle V and the parking area lines K drawn on the road surface R of the parking lot P for the vehicle V to be parked. Parking frames A1 to A4 and B1 to B4 representing parking spaces are provided between the parking area lines K. In the example shown in FIG. 5, the parking lot P includes a reverse parking frame group AG and a forward parking frame group BG The reverse parking frame group AG includes the parking frames A1 to A4 to which the vehicle V generally enters backward or rearward to park itself therein (i.e., reverse or backward parking). In the reverse parking frame group AG, the angle θ1 of the parking area line K (K1 to K5) with respect to the traveling direction of the vehicle V is smaller than 90 degrees. The forward parking frame group BG includes the parking frames B (B1 to B4) to which the vehicle V generally enters forward to park itself therein (i.e., forward or head-first parking). In the forward parking frame group BG, the angle θ2 of the parking area line K (k1 to k5) with respect to the traveling direction of the vehicle V is larger than 90 degrees (smaller than 90 degrees as relative angle).

FIG. 6 to FIG. 9 are views schematically illustrating an overhead image G generated by synthesizing signals of the image captured by the camera 20 and edges detected from the overhead image G. Each of the overhead image G in FIG. 6 to FIG. 9 includes an X-axis and a Y-axis. The X-axis extends in a direction along the traveling direction of the vehicle V. The Y-axis extends in a direction orthogonal to the traveling direction.

The overhead image G illustrated in FIG. 6 to FIG. 9 is generated by converting images based on the image signals of the images captured by the cameras 20a to 20d into overhead images g1, g2, g3, and g4 in which the vehicle V is viewed from the just above, and by synthesizing the respective overhead images g1 to g4. An icon I is displayed in the center portion of the overhead image G. The icon I indicates the state that the vehicle V is viewed from directly above.

The parking area line is generally drawn in white, but may be drawn in other colors such as yellow. The parking area line detected by the line extraction portion 111 is not limited to the white line, and a borderline having a contrast with respect to a road surface R is generally detected as the parking area line.

The line extraction portion 111 scans the overhead image G in a predetermined direction to detect pixels of which brightness or color parameters (e.g., RGB, RGBA) included in the image signal increase larger than a threshold and to detect a portion in which the arrangement of the detected pixels has a given length or more as an edge. The scanning described herein is meant to select a pixel one by one in the predetermined direction, and compare the brightness or the color parameter between the adjacent pixels.

It is preferable for the scanning direction to be set to the direction crossing the parking area lines K on the road surface R. More specifically, when the parking area lines K extend in the direction orthogonal to the traveling direction (see arrow in FIG. 5) of the vehicle V or in the direction that diagonally crossing the traveling direction as shown in FIG. 5, it is preferable to scan in the traveling direction of the vehicle V (i.e., X-axis direction in FIG. 6, etc.) on the overhead image G (see FIG. 6, etc.). On the other hand, when the parking area lines K extend in the traveling direction of the vehicle V, it is preferable to scan in the direction orthogonal to the traveling direction of the vehicle V (i.e., Y-axis direction in FIG. 6, etc.) on the overhead image G. Generally, the extending directions of the parking area lines K are unknown. Accordingly, it is desirable for the line extraction portion 111 to scan twice in both the traveling direction of the vehicle V and the direction orthogonal to the traveling direction on the overhead image G.

The line extraction portion 111 detects a positive edge (also referred to as rising edge) and a negative edge (also referred to as falling edge) from the detected plurality of edges. The positive edge has a brightness difference or a color parameter difference of the adjacent pixels larger than a predetermined value in the positive direction. The negative edge has a brightness difference or a color parameter difference of the adjacent pixels larger than a predetermined value in the negative direction.

When the edge is extracted based on the brightness, the pixel array changed (changed in positive direction) into high brightness bright pixels (for example, white pixels) having a difference larger than a threshold from low brightness dark pixels (for example, black pixels) is detected as the positive edge. That is, the change in the brightness in the positive direction shows that the scanning position is switched to a position estimated as the parking area line from the road surface R. The pixel array changed (changed in negative direction) into low brightness dark pixels having a difference larger than the threshold from high brightness bright pixels is detected as the negative edge. That is, the change in the brightness in the negative direction shows that the scanning position is switched to the road surface R from the position estimated as the parking area line.

On the other hand, when the edge is extracted based on the color parameter, the color parameter of the road surface and the color parameter of the parking area line are compared. The line extraction portion 111 detects the pixel array in which the value of the color parameter is changed in the increase direction (changed in negative direction) as the negative edge and the pixel array in which the value of the color parameter is changed in the decrease direction (changed in positive direction) as the positive edge. When the brightness of the parking area line is lower than that of the road surface (or color parameter is larger), the changes in the brightness and the color parameter are reversed. In any case, the positive edge and the negative edge are detected on the first and second side edges of the borderline such as the parking area line, which makes later-described pair extraction possible.

The line extraction portion 111 detects a line segment (pixel arrangement, pixel array) constituted by the consecutive positive edges in the direction crossing the scanning direction as the line segment of the positive edge and a line segment (pixel array) constituted by the consecutive negative edges as the line segment of the negative edge by repeating the above scanning for a plurality of lines.

Also, the line extraction portion 111 may filter the detected line segments of the positive edge and the negative edge by a length according to a reference length, and cancel the line segments of the positive edge and the negative edge which do not meet the reference length. In addition to the length, the line segments may be filtered by a direction (angle) in which line segments extend.

The line extraction portion 111 calculates the positions (coordinates) of the start point and the finish point of each of the detected line segments of the negative and positive edges. The line extraction portion 111 extracts, based on the calculated positions, the line segment of the positive edge and the line segment of the negative edge next to each other with a predetermined distance and a predetermined angle thereof and determines them as a pair of the edges constituting the parking area lines. On the other hand, the line segment of the edge extending in a direction other than the predetermined angle, and the line segment of the edge which cannot find the pair are canceled as noise.

The parking area line detection portion 112 detects the parking area line based on a pair of the line segments of the positive and negative edges which have been detected as the line by the line extraction portion 111. More specifically, the parking area line detection portion 112 extracts, from the detected pairs of the line segments of the edges, a pair of the line segments of the positive and negative edges that have lengths longer than a predetermined reference length and extend in a predetermined direction (angle). The distance between the extracted line segments of the positive and negative edges is calculated based on the positions of the start points or the like. The line segments are determined as a pair of line segments if the calculated distance is within the range of a predetermined line width±a permissible error. The parking area line detection portion 112 registers or stores the positions (coordinate values) of the start point and the finish point of each of the line segments of the negative and positive edges, which have been determined as the pair of the line segments, as parking area line data 124 in a temporary storage portion 123 of the memory 120.

The reference length at the detection of the parking area line is set to have a length shorter than the vehicle length in the present embodiment. However, the reference length may be set to have a length equal to the vehicle length (e.g., 5 m), for example. The predetermined angle used herein is set by considering the traveling direction of the vehicle V, the direction of the camera 20 that captures images, and the like. In the case shown in FIG. 6, the predetermined angle of each of the parking area lines with respect to the traveling direction is set to 45°±a permissible error since the parking area lines are straight lines extending diagonally toward the parking space with respect to the traveling direction.

Figure 6:
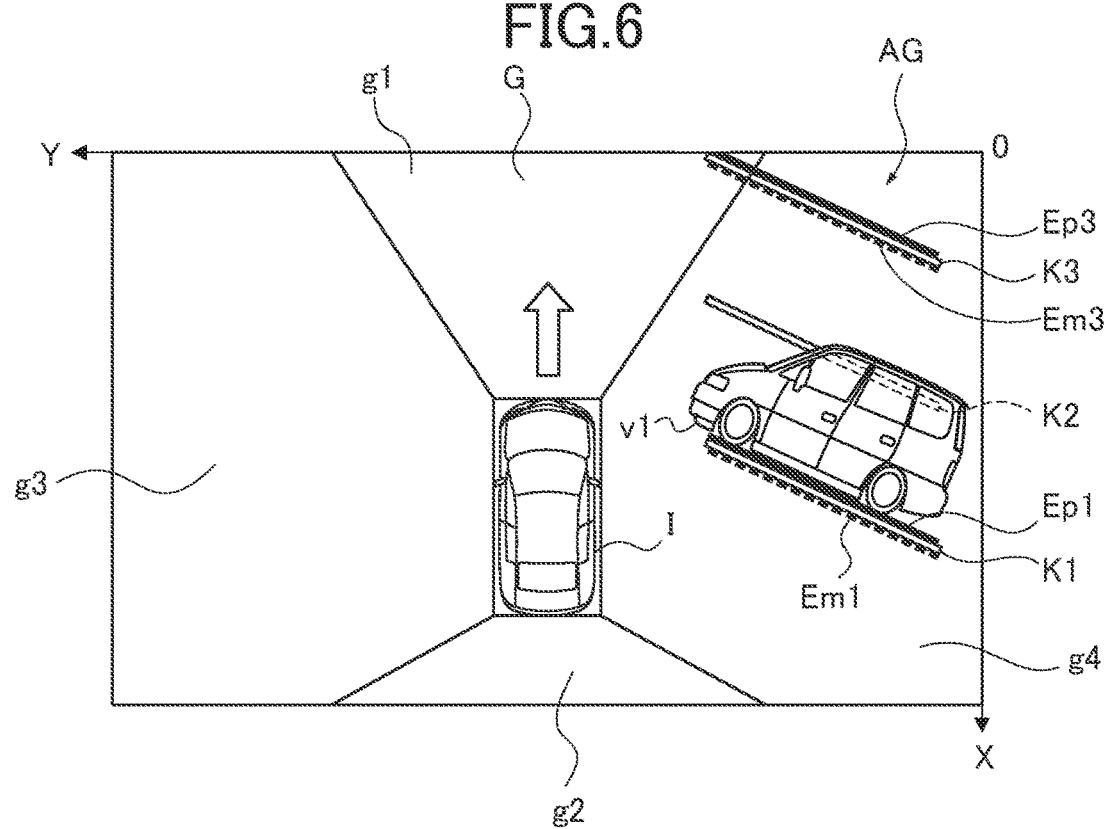
FIG. 6 is a view illustrating an example of the operation of the image processor according to the embodiment to schematically show detected edges and the parking frames on an overhead image.

FIG. 6 schematically illustrates the positive edges and the negative edges detected from the overhead image G acquired at a predetermined detection timing. In FIG. 6, the positive edges are shown with bold solid lines while the negative edges are shown with bold dashed lines. The overhead image G includes the reverse parking frame group AG The following explanation assumes that the image processor 100 detects the reverse parking frames A. However, the image processor 100 may be used to detect the forward parking frames B of the forward parking frame group BG In the example shown in FIG. 6, the parking area lines K1 and K3 are located on the right side of the vehicle V (icon I). The line segments Ep of the positive edges are detected on one side of the respective parking area lines K1 and K3 (actually, the images of the parking area lines K1 and K3). The line segments Em of the negative edges are detected on the other side of the respective parking area lines K1 and K3. Specifically, the line segment Ep (Ep1 and Ep3) of the positive edge is detected on a downstream side of scanning in the X-axis direction while the line segment Em (Em1 and Em3) of the negative edge is detected on an upstream side of scanning. The parking area line K2 is hidden by another vehicle V1 parked in the parking frame A1. Accordingly, the parking area line K2 is not extracted as the line or is regarded as the line shorter than the reference line to be canceled as the noise, so that the parking area line K2 is not detected as the parking area line.

Figure 7:
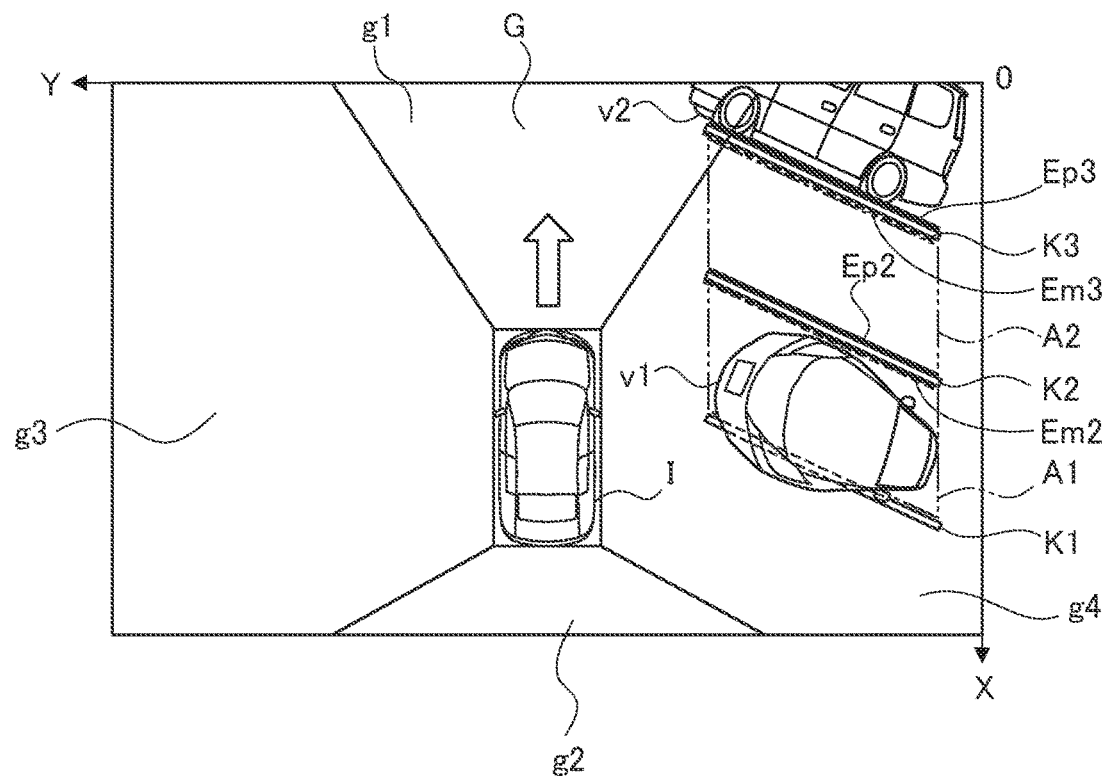
FIG. 7 is a view illustrating an example of the operation of the image processor according to the embodiment to schematically show the detected edges and the parking frames on an overhead image acquired at a timing different from one in FIG. 6 because of the movement of the vehicle.

Assuming that the vehicle V travels on the road surface R, and the overhead image G as shown in FIG. 7 is acquired at a detection timing (time) different from one in FIG. 6. The parking area line K1 has been detected as the parking area line at the detection timing in FIG. 6. However, in the case shown in FIG. 7, the parking area line K1 cannot be detected as the parking area line at the defection timing in FIG. 7 since the parking area line K1 is hidden by the other vehicle V1. The parking area line K2 has not been detected as the parking area line at the detection timing in FIG. 6. However, at the detection timing in FIG. 7, the parking area line K2 is detected as the parking area line that consists of the line segment Ep2 of the positive edge and the line segment Em2 of the negative edge. Therefore, the parking frame A2 between the parking area lines K2 and K3 is detected but the parking frame A1 between the parking area lines K1 and K2 is not detected at the detection timing in FIG. 7. Further, in the case that the detection of the angle parking frames is performed, the parking frame A2 may not be registered as a target parking frame and is canceled since there is no continuity as the angle parking frames.

To overcome the above issue, the tracking determination portion 113, the comparing portion 114, and the parking area line determination portion 115 keep tracking the line that is extracted by the line extraction portion 111 but is not determined as the parking area line constituting the parking frame. Thereby, the parking frame defined by the hidden parking area line can be detected even if the parking area line is hidden by the other vehicle V1 or the like and is not detected.

Therefore, the tracking determination portion 113 determines whether the line extracted at a predetermined timing by the line extraction portion 111 fulfills predetermined conditions or not and extracts the line determined as fulfilling the predetermined conditions as a line to be tracked (also referred to as tracking target line, hereinafter). Further, the tracking determination portion 113 stores information of the extracted lines in the memory 120. The comparing portion 114 compares the line determined by the tracking determination portion 113 as fulfilling the predetermined conditions with the line extracted by the line extraction portion 111 from the overhead image G based on the signals of the images captured at the predetermined timing in the past to determine degrees of similarity and coincidence thereof. As the result of the comparison result from the comparing portion 114, the parking area line determination portion 115 determines the tracking target line whose degrees of similarity and coincidence are equal to or more than the given value as the parking area line.

Hereinafter, the processes of the determination portion 113, the comparing portion 114, and the parking area line determination portion 115 will be described in detail. The tracking determination portion 113 executes a process (1) of tracking determination of the line. The comparing portion 114 executes a process (2) of determination (comparison) of similarity and coincidence. The parking area line determination portion 115 executes a process (3) of additional determination of the tracking information (determination of parking area line).

The process (1) "tracking determination of the line" will be described hereinafter. The tracking determination portion 113 determines whether the following conditions are fulfilled or not to extract a line within a predetermined range as the tracking target line (i.e., tracking determination of line). The tracking determination portion 113 determines the line that fulfills the conditions as the tracking target line (line to be tracked) and registers information of the tracking target line (coordinate values of start and finish points of line segments of positive and negative edges, for example) as the tracking information data 125 in the temporary storage portion 123 of the memory 120.

The first condition of the process (1) is that the length of the line is equal to or longer than a predetermined line length (e.g., equivalent to 1.5 m). This condition makes it possible to eliminate a shorter line other than the parking area line and extract the line that is most likely to be the parking area line as the tracking target line. The second condition is that the angle of the line is within a predetermined angle range (e.g., 65 to 40 degrees). This condition makes it possible to extract the line constituting the angle parking frame, for example. The third condition is that the width of the line calculated based on the line segments of the positive and negative edges is equal to or smaller than a predetermined width (e.g., 8 pixels≈24 cm). This condition makes it possible to absorb the expansion and contraction of the width of the parking area line image due to variation in the width of the parking area line, the distortion of the lens, conversion to the overhead image, or the like. The fourth condition is that a difference between an angle of the line segment of the positive edge and an angle of the line segment of the negative edge is equal to or smaller than a predetermined angle difference (e.g., 3 degrees). This condition makes it possible to appropriately extract the line as the tracking target line even if there is a slight error in the angles of the edges.

The process (2) "determination (comparison) of the similarity and coincidence" will be described hereinafter. The comparing portion 114 executes a two-step determination including the determinations of similarity and coincidence between the detected parking area line and the tracking target line represented by the tracking information data 125 that is stored in the memory 120. By executing the two-step determination, if the angle of the inclined line is detected as being slightly changed at different timings, for example, the line is not registered as a plurality of different tracking target lines but registered as a single tracking target line, which improves accuracy and speed of the process.

First, the determination of similarity will be described. The comparing portion 114 determines all of the following conditions are fulfilled or not. The comparing portion 114 determines that the lines are similar to each other in the case the conditions are fulfilled and then executes the determination of coincidence. On the other hand, the comparing portion 114 determines that the lines are not similar in the case that the conditions are not fulfilled and does not execute the determination of coincidence. The first condition of the determination of similarity is that the angle difference between the line segment of the positive edge of a candidate tracking target line and the line segment of the positive edge of the tracking information data as well as the angle difference between the line segment of the negative edge of the candidate tracking target line and the line segment of the negative edge of the tracking information data are equal to or smaller than a predetermined angle difference (e.g., 11 degrees). The second condition is that the difference of the distance between the start point of the line segment of the positive edge of the candidate tracking target line and the start point of the line segment of the positive edge of the tracking information data, the difference of the distance difference between the finish point of the line segment of the positive edge of the candidate tracking target line and the finish point of the line segment of the positive edge of the tracking information data, the difference of the distance between the start point of the line segment of the negative edge of the candidate tracking target line and the start point of the line segment of the negative edge of the tracking information data, as well as the difference of the distance difference between the finish point of the line segment of the negative edge of the candidate tracking target line and the finish point of the line segment of the negative edge of the tracking information data are equal to or smaller than a predetermined distance difference (e.g., 12 pixels≈36 cm).

Next, the determination of coincidence will be described. In the case that the speed of the vehicle V is equal to or less than a predetermined speed (e.g., 0 km/h), the determination of coincidence is not executed. Accordingly, even if there is a false detection of the lines due to three-dimensional objects such as other vehicles while the vehicle V is being parked or traveling at a low speed below the predetermined speed, these lines are not determined as the tracking target lines, which improves the accuracy of the process. The vehicle speed is acquired by the vehicle speed acquisition portion 117, which is described below.

The comparing portion 114 determines whether all of the following conditions are fulfilled or not. The comparing portion 114 determines that the lines are coincident with each other in the case that the conditions are fulfilled and counts up the detection number. On the other hand, the comparing portion 114 determines that the lines are not coincident with each other in the case that conditions are not fulfilled and does not count up the detection number.

The first condition of the determination of coincidence is that the angle difference between the line segment of the positive edge of the candidate tracking target line and the line segment of the positive edge of the tracking information data as well as the angle difference between the line segment of the negative edge of the candidate tracking target line and the line segment of the negative edge of the tracking information data are equal to or smaller than a predetermined angle difference (e.g., two degrees). The second condition is that the difference of the distance between the start point of the line segment of the positive edge of the candidate tracking target line and the start point of the line segment of the positive edge of the tracking information data, the difference of the distance between the finish point of the line segment of the positive edge of the candidate tracking target line and the finish point of the line segment of the positive edge of the tracking information data, the difference of the distance between the start point of the line segment of the negative edge of the candidate tracking target line and the start point of the line segment of the negative edge of the tracking information data, as well as the difference of the distance between the finish point of the line segment of the negative edge of the candidate tracking target line and the finish point of the line segment of the negative edge of the tracking information data are equal to or smaller than the predetermined distance difference (e.g., reference value, two pixels).

The process (3) "additional determination of the tracking information (determination of parking area line)" will be described hereinafter. In the case that all of the following conditions are fulfilled, the parking area line determination portion 115 determines that the tracking information of the tracking target line is a target to be added (additional target) as the parking area line. The parking area line determination portion 115 registers the tracking information of the tracking target line as the parking area line data 124 in the memory 120 in addition to the tracking information to the parking area lines detected by the parking area line detection portion 112. Thereby, even if the tracking target line is hidden by the other vehicle V1 or the like and not detected, the parking frame can be properly detected by setting this tracking target line as the parking area line. On the other hand, in the case that the conditions are not fulfilled, the parking area line determination portion 115 determines that the tracking information of the tracking target line is not the additional target and does not register the tracking information as the parking area line data 124.

The first condition of the process (3) is that the tracking target line (tracking information) has not been detected as the parking area line at a current detection timing (referred to as "this cycle" hereinafter). In the case that this condition is fulfilled, the overlap of the tracking target line and the line detected as the parking area line and displayed on the overhead image G (i.e., line is not hidden) is avoided. The second condition is that the detection number counted as the tracking target line is equal to or more than a predetermined number of times (e.g., once). In the case that this condition is fulfilled, false detection such as detecting the edge of a three-dimensional object as the tracking target line can be avoided. The third condition is that the length of the tracking target line (line segments of positive and negative edges) is equal to or longer than a predetermined length (e.g., 30 pixels≈90 cm). In the case that this condition is fulfilled, only lines that are appropriate as the parking area lines can be additionally registered as the parking area lines.

The values (threshold values) such as the lengths, the angles, the distance differences, the vehicle speeds are only examples and the values used in the present disclosure are not limited thereto. The values can be set appropriately according to the image resolution, the type of the vehicle to be parked (e.g., compact, medium-size, full-size vehicle), the width and shape (e.g., single line, U-shape lines, T-shape lines, cross lines, etc.) of the parking area lines. These values should be registered in the memory 120 as the parameter data 122 that can be updated, so that the processes can be more appropriately performed depending on the conditions of the parking area lines and the purpose of tracking.

The parking frame setting portion 116 estimates a parking frame based on each pair of the segment lines of the positive and negative edges registered as the parking area line data 124 in the memory 120 and sets the estimated parking frame on the overhead image G Specifically, the parking frame setting portion 116 selects, from a plurality of pairs of the line segments of the positive and negative edges, two line segments of the edges that are adjacent to each other and may constitute the parking space. The selected two line segments are lines that face each other and respectively constitute the right and left sides of a pair of the parking area lines defining the parking space. Specifically, one of the two line segments constitutes the right side of one of the parking area lines while the other of the two line segments constitutes the left side of the other of the parking area lines.

The parking frame setting portion 116 calculates the distance between the selected line segments of the edges (inner dimension between adjacent parking area lines) based on the coordinate values of the endpoints of each edge and determines whether the calculated distance falls within a predetermined range or not. In the case that the distance falls within the predetermined range of the parking space width±a permissible error, the area defined by the two line segments of the edges is determined as the parking space. In the case of the parking space for a middle-size vehicle, a small truck, or the like, it is preferable to have a width of 2 m to 3 m. In the case of the parking space for a large truck, a bus, or the like, it is preferable to have the width equal to or more than 3.3 m.

The parking frame setting portion 116 converts the set parking frame information, that is coordinate values of the endpoints of the line segments of the positive and negative edges that face each other and constitute the parking frame, to the coordinate values of the start point or finish point of the parking frame and registers these coordinate values in the memory 120 as the parking frame registration data 121. At this time, by registering the coordinate values of at least two start points of the parking frame, the parking frame can be specified while reducing the storage capacity as much as possible. However, four coordinate values may be registered. Also, the angles (extending directions) of the parking area lines K, other information required for the vehicle parking process may be added to the parking frame registration data 121.

Also, the parking frame setting portion 116 may execute a process for determining whether the vehicle V can be parked in the set parking frame or not. For example, when obstacles such as the other vehicle V1 exists in the parking space, the parking frame setting portion 116 may determine that the vehicle V cannot be parked in the parking space so as not to register the parking space in the memory 120 as the parking frame registration data 121. Also, the parking frame setting portion 116 may determine the parking frame that is close to the vehicle V or easier to park as an available parking frame and register the determined parking frame in the memory 120 as the parking frame registration data 121.

The vehicle speed acquisition portion 117 acquires the speed of the vehicle V from the vehicle control ECU 40. For example, the vehicle control ECU 40 converts the wheel speed input from the wheel speed sensor 32 to the vehicle speed and transmits the converted vehicle speed to the vehicle speed acquisition portion 117. Alternatively, the vehicle speed acquisition portion 117 may acquire the wheel speed from the vehicle control ECU 40 and convert the wheel speed to the vehicle speed. The procedures for acquiring the vehicle speed are not limited to the above examples and the sensor is not limited to the wheel speed sensor 32. Other known sensors or procedures may be used to acquire the vehicle speed.

The angle parking frame determination portion 118 determines whether a plurality of parking frames set by the parking frame setting portion 116 is angle parking frames or not. The angle parking frame determination portion 118 determines that the parking frame is the angle parking frame in the case that the angles of the edges of the parking frame with respect to the vehicle V fall within a range of 45±5 degrees (relative angle), for example. Alternatively, the plurality of parking frames is determined as the angle parking frames (angle parking frame group) in the case that the plurality of parking frames is set continuously and the relative angles of the parking frames, the positions of the start points of the line segments of the positive and negative edges, or the like are compared and determined as being coincident with each other within respective predetermined ranges. These determinations are only examples and accordingly, the angle parking frame may be determined by other procedures.

When the angle parking frame determination portion 118 determines that the parking frame is not the angle parking frame, such a parking frame is not registered as the parking frame since there is a possibility of false detection. Alternatively, the angle parking frame determination portion 118 determines that the parking frame is the perpendicular or side-by-side parking frame that extends substantially perpendicular to the vehicle V or the parallel parking frame that extends substantially parallel to the vehicle V based on the width, length, angles of the parking frame.

The display control portion 119 transmits the display control signal for displaying images on the monitor 31 to the navigation device 30 and controls the monitor 31. Specifically, the display control portion 119 transmits the display control signal for displaying on the monitor 31 the images of the surroundings of the vehicle V captured by the camera 20 or the overhead image G in accordance with the signal obtained by combining the images of the surroundings. Also, the display control portion 119 may transmit the display control signal for superimposing the parking frame image that shows the parking frame selected by the parking frame setting portion 116 as the display target (e.g., parking frames A1, A2, etc. shown in FIG. 7 with phantom lines) on the road surface image or the overhead image G and displaying the superimposed parking frame image.

The line extraction process by the line extraction portion 111, the parking area line detection process by the parking area line detection portion 112, the tracking determination process by the tracking determination portion 113, the comparison process by the comparing portion 114, the parking area line determination process by the parking area line determination portion 115, the parking frame setting process by the parking frame setting portion 116, the angle parking frame determination process by the angle parking frame determination portion 118, and the display control process by the display control portion 119 are executed every time the images captured by the camera 20 while the vehicle V is traveling are updated. Therefore, even if the parking area line is not detected at a certain detection timing due to being hidden by the three-dimensional objects such as the other vehicles V1, V2, or shadows, but such a non-detected parking area line has been previously detected and registered as the tracking information, this non-detected parking area line can be added as the parking area line. Thereby, the parking frame can be properly set.

The memory 120 includes a recording medium, for example, a large-capacity recording medium such as a hard disk drive and a semiconductor recording medium such as a ROM and a RAM. Various data for use in various operations in the control portion 110 are temporarily or non-temporarily stored in the memory 120.

As described above, the parking frame registration data 121 and the parameter data 122 are non-temporarily registered in the memory 120. The parking frame registration data 121 is referred to by the vehicle control ECU 40 or the like. The reference length of the parking area line, the width of the parking space, the threshold values thereof and the like may be registered as the parameter data 122. Further, various parameters such as the widths, extending angles of the parking area lines, or the like that are used by the image processor 100 may be registered. Also, it is possible to adopt a configuration that registers a plurality of petameters and selects appropriate parameters depending on areas, countries where the parking assist device 1 is used, shapes and/or sizes of the parking spaces (parking frames), or the like.

Also, the parking area line data 124 and the tracking information data 125 are temporarily registered in the temporary storage portion 123 of the memory 120. As described above, the positions (coordinate values) of the start and finish points of the line segments of the positive and negative edges of the parking area line are registered in the parking area line data 124 for each of the detected parking area lines. The positions (coordinate values) of the start and finish points of the line segments of the positive and negative edges of the tracking target line as well as the numbers of the detection as the lines are registered in the tracking information data 125 for each of the detected tracking target lines.

Next, an example of the operation of the image processor 100 according to the present embodiment will be described with reference to the flowcharts shown in FIGS. 4A and 4B.

Figure 4A:
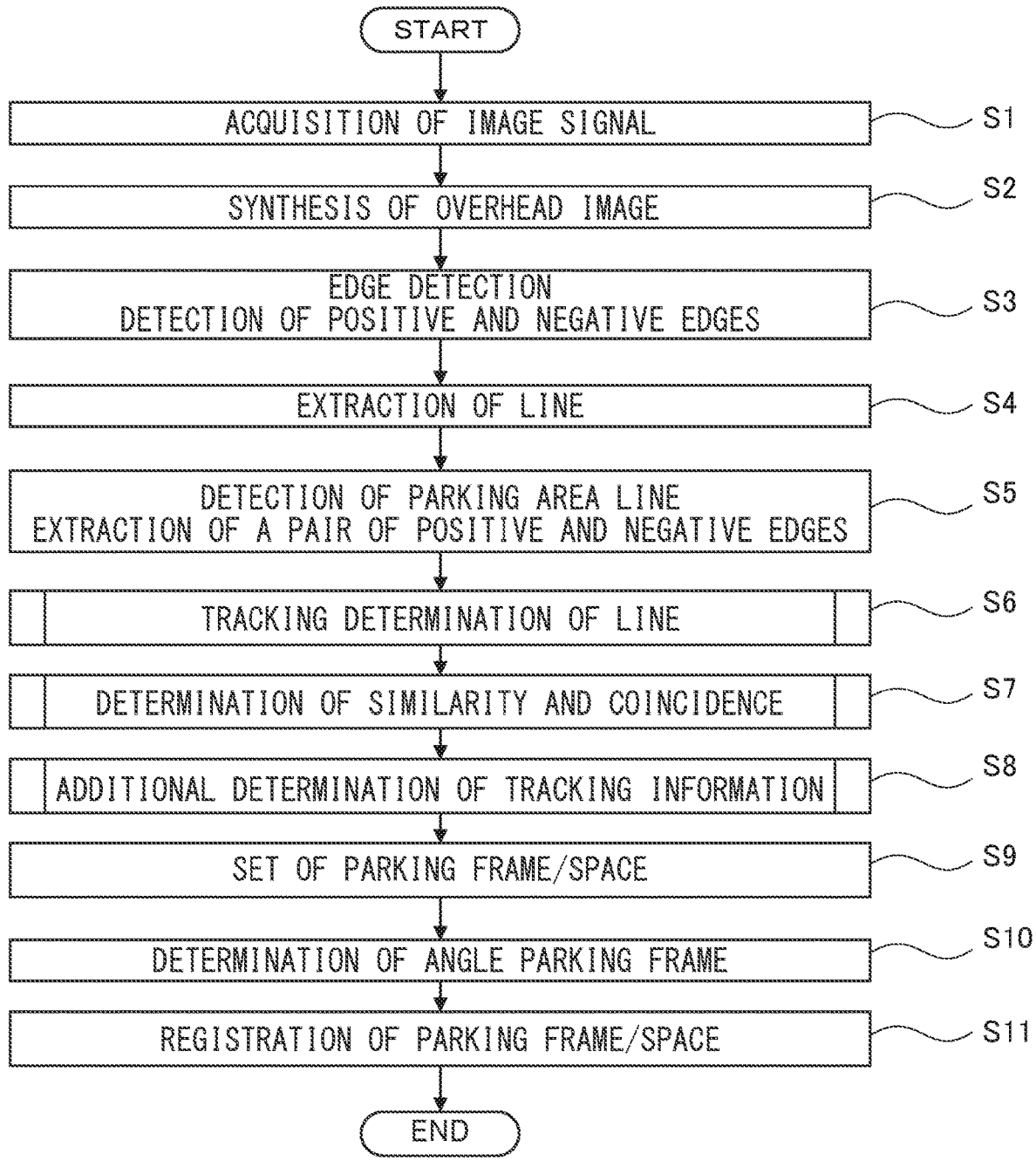
FIG. 4A is a flowchart describing an example of an operation of the image processor of the embodiment.
Figure 4B:
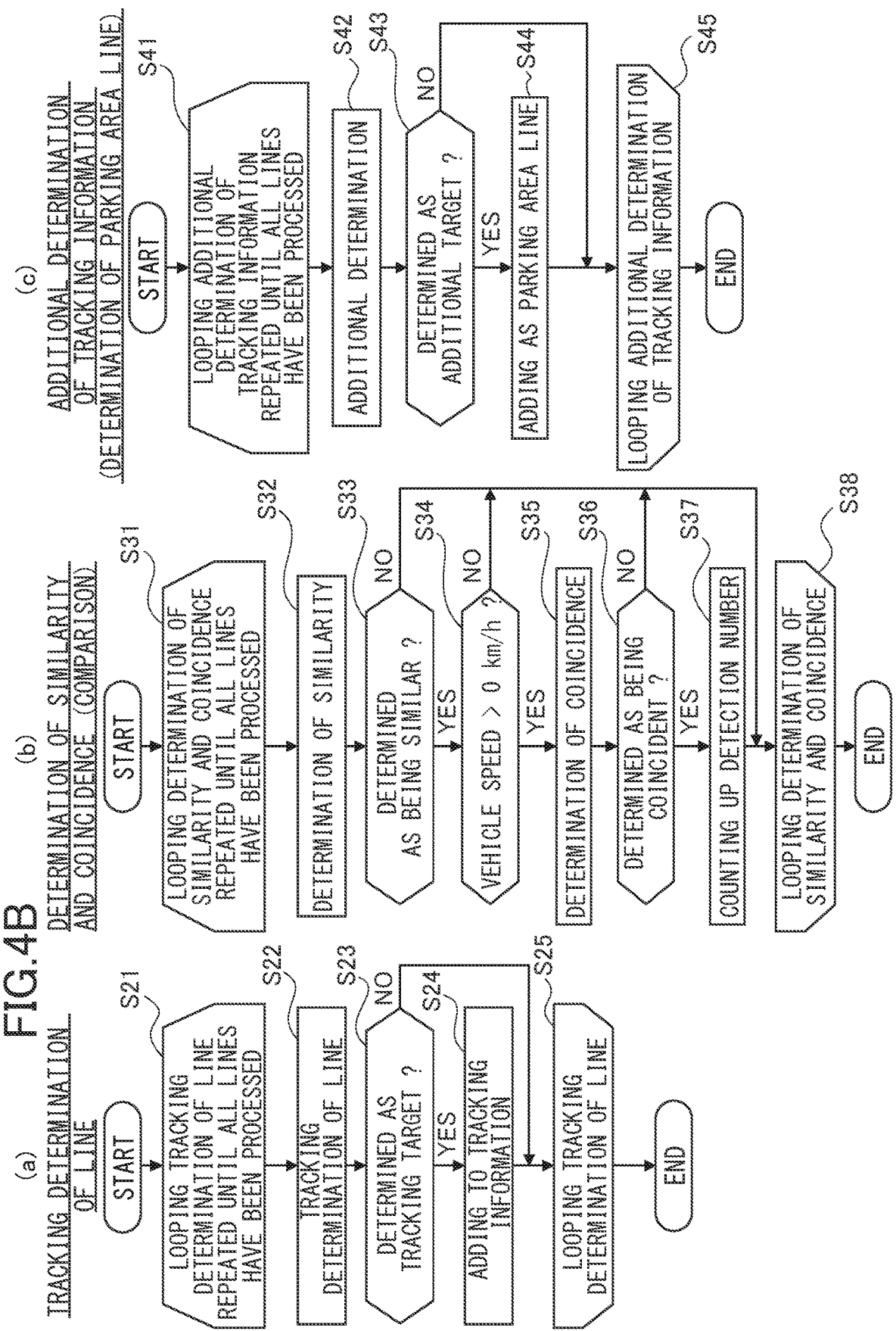
FIG. 4B shows flowcharts describing examples of operations of a tracking determination portion, (a) illustrating tracking determination of the lines, (b) illustrating determination of similarity and coincidence (comparison), and (c) illustrating additional determination of tracking information (parking area line determination).

FIGS. 4A and 4B are flowcharts describing the operations of the image processor 100. The operations shown in the flowcharts of FIGS. 4A and 4B start when the driver inputs the automatic parking start instruction by pressing or touching the automatic parking start switch (not shown).

In Step S1, the control portion 110 of the image processor 100 acquires the image signals of the road surface R around the vehicle V captured by the camera 20.

In Step S2, the control portion 110 generates a signal by synthesizing the image signals acquired in Step S1. The generated signal by synthesizing the signals in Step S2 is the signal for displaying, on the monitor 31 of the navigation device 30, an image as if a camera were installed above the vehicle V and looked down directly below (see "the overhead image G" shown in FIG. 6, etc.). The generation of the signal for displaying such an overhead image is known in the art as disclosed in JPH03-99952A and JP2003-118522A, for example. The display control portion 119 transmits the display control signal for displaying the overhead image G on the monitor 31 to the navigation device 30. Thereby, the driver can see the overhead image G displayed on the monitor 31.

Note that the signal synthesizing process for displaying the overhead image G may not be executed in Step S2, or the signal synthesizing process in Step S2 may be executed after the extraction of the positive and negative edges in Step S3. However, executing the process in Step S3 after the signal synthesizing process can reduce the processing load on the image processor 100 more.

In Step S3 (edge detection step), as described above, the line extraction portion 111 scans the overhead image G generated in Step S2 in a predetermined direction and extracts the positive and negative edges in the image based on the brightness included in the image signal.

In the example shown in FIG. 6, etc., the line extraction portion 111 scans the overhead image G in the X-axis positive direction to detect the positive edges and the negative edges in the image. When the pixels are scanned in the X-axis negative direction, the positive edges and the negative edges are reversed. Also, the line extraction portion 111 may detect the positive and negative edges based on the information of the color parameters (for example, RGB, RGBA) included in the image signals. In this case, these are detected based on the change in the intensity (tone) of a predetermined color.

Further, the line extraction portion 111 filters the detected positive and negative edges based on the reference length described above. Thereby, the short edge caused by the light reflection on the road surface, the waste, and the stain is canceled as noise. The filtering may be performed after the extraction of a pair of edges in Step S4, but a high-speed image process may be achieved by eliminating the noise before the extraction of the pair of edges.

In Step S4 (line extraction step), the line extraction portion 111 extracts the line segments of the positive and negative edges adjacent to each other at the predetermined interval and the predetermined angle and determines the edges as a pair of edges constituting the line. On the other hand, the line segment of the edge that is not paired is canceled as noise.

In Step S5 (parking area line detection step), the parking area line detection portion 112 determines whether the plurality of pairs of the edges detected in Step S4 is pairs of the edges constituting the parking area lines or not. The parking area line detection portion 112 registers the positions (coordinate values) of the start and finish points of the line segments of the positive and negative edges detected as the pair as the parking area line data 124 in the temporary storage portion 123 of the memory 120.

Next, Steps S6 to S8 are continuously executed. These steps may be executed after Step S5 or in parallel with Step S5.

Step S6 (line tracking determination step) will be described with reference to FIG. 4B(a) in detail. As shown in FIG. 4B(a), in the line tracking determination step, the tracking determination portion 113 executes the looping process of the line tracking determination from Step S21 to Step S25. The processes from Step S21 to Step S25 are terminated when the processes to all of the lines extracted in Step S4 are determined as being completed.

In Step S21, the tracking determination portion 113 selects one line to be processed and determines whether the conditions of the process (1) described above are fulfilled or not in Step S22. In the case that the conditions are fulfilled, the tracking determination portion 113 determines the line as the tracking target (i.e., YES in Step S23), and the program proceeds to Step S24. In the case that the conditions are not fulfilled, the tracking determination portion 113 does not determine the line as the tracking target (i.e., NO in Step S23) and the program skips Step S24 and proceeds to Step S25.

In Step S24, the tracking determination portion 113 registers the information (coordinate values of start and finish points of line segments of positive and negative edges) of the line determined as the tracking target as the tracking information data 125 in the temporary storage portion 123 of the memory 120. Then, the program proceeds to Step S25.

In Step S25, the tracking determination portion 113 determines whether there is another tracking target line that should be processed next or not. In the case that there is the tracking target line that should be processed, the program returns to Step S21. Then, the tracking target line is selected and the processes from Step S22 are executed. In the case that there is no line to be processed, the looping process is terminated and the program proceeds to Step S7 shown in FIG. 4A.

Step S7 (similarity and coincidence determination step) will be described in detail with reference to FIG. 4B(b). As shown in FIG. 4B(b), in the similarity and coincidence determination step (comparison step), the comparing portion 114 executes the looping process of the similarity and coincidence determination from Step S31 to S38. The processes from Step S31 to S38 are terminated when the processes to all of the tracking target lines extracted in Step S6 are determined as being completed.

In Step S31, the comparing portion 114 selects one tracking target line and determines whether the tracking target line fulfills the conditions of similarity in the process (2) described above or not in Step S32 (similarity determination step). In the case that the conditions are fulfilled, the comparing portion 114 determines that the detected parking area line and the tracking target line are similar to each other (YES in Step S33), and the program proceeds to Step S34. In the case that the conditions are not fulfilled, the comparing portion 114 determines that the detected parking area line and the tracking target line are not similar to each other (NO in Step S33), and the program skips Step S34 to Step S37 and proceeds to Step S38.

In Step S34, the comparing portion 114 determines whether the vehicle speed is more than 0 km/h (i.e., vehicle speed >0 km/h) or not to determine whether the vehicle V is moving or parked. When the comparing portion 114 determines that the vehicle speed is more than 0 km/h (YES in Step S34), that is the vehicle V is moving, the program proceeds to Step S35. When the comparing portion 114 determines that the vehicle speed is not more than 0 km/h (NO in Step S34), that is the vehicle V is parked, the program skips Step S35 to Step S37 so as not to execute the determination of coincidence and proceeds to S38.

In Step S35 (coincidence determination step), the comparing portion 114 determines whether the lines fulfill the conditions of coincidence of the process (2) described above or not. In the case that the conditions are fulfilled, the comparing portion 114 determines that the detected parking area line and the tracking target line are coincident with each other (YES in Step S36), and the program proceeds to Step S37. In the case that the conditions are not fulfilled, the comparing portion 114 determines that the detected parking area line and the tracking target line are not coincident with each other (NO in Step S36), and the program skips Step S37 and proceeds to S38.

In Step S37, the comparing portion 114 counts up the detection numbers for the tracking target lines that have been determined as being similar and coincident and updates the tracking information data 125. Then, the program proceeds to Step S38.

In Step S38, the comparing portion 114 determines whether there is another tracking target line that should be processed next or not. In the case that the comparing portion 114 determines that there is the tracking target line that should be processed, the program returns to Step S31. Then, the tracking target line is selected and the processes from Step S32 are executed. In the case that the comparing portion 114 determines that there is no tracking target line that should be processed, the looping process is terminated and the program proceeds to Step S8 shown in FIG. 4A.

Step S8 (tracking information additional determination step) will be described in detail with reference to FIG. 4B(c). As shown in FIG. 4B(c), in the tracking information additional determination step (parking area line determination step), the parking area line determination portion 115 executes the looping process of the additional determination of the tracking information from Step S41 to S46. The processes from Step S41 to S45 are terminated when the processes to all of the tracking target lines whose tracking information data 125 is registered in the temporary storage portion 123 are determined as being completed.

In Step S41, the parking area line determination portion 115 acquires the tracking information data 125 of one of the tracking target lines that should be processed from the temporary storage portion 123 and determines whether the tracking target line should be added as the parking area line or not in Step S42 (additional determination step). Specifically, the parking area line determination portion 115 determines whether the conditions of the process (3) described above are fulfilled or not. In the case that the conditions are fulfilled, the parking area line determination portion 115 determines the line as the additional target (i.e., YES in Step S43), and the program proceeds to Step S44. In the case that the conditions are not fulfilled, the parking area line determination portion 115 does not determine the line as the additional target (i.e., NO in Step S43), the program skips Step S44 so as not to add the line as the parking area line and proceeds to Step S45.

In Step S44, the parking area line determination portion 115 additionally registers the tracking information (coordinate values of start and finish points of line segments of positive and negative edges) of the tracking target line as the parking area line data 124 in the memory 120.

In Step S45, the parking area line determination portion 115 determines whether there is another tracking target line that should be processed next or not. In the case that the parking area line determination portion 115 determines that there is the tracking target line that should be processed, the program returns to Step S41. Then, the tracking target line is selected and the processes from Step S42 are executed. In the case that the parking area line determination portion 115 determines that there is no tracking target line that should be processed, the looping process is terminated and the program proceeds to Step S9 shown in FIG. 4A.

In Step S9 (parking frame setting step), the parking frame setting portion 116 detects the parking frame and the parking space by using the procedures described above based on the parking area line data 124 registered in the temporary storage portion 123. The temporary storage portion 123 includes the parking area line data 124 detected and registered by the parking area line detection portion 112 in Step S5 and the parking area line data 124 additionally registered by the parking area line determination portion 115 in Step S8. Accordingly, the parking frame setting portion 116 can properly set the parking frame based on the parking area lines detected in this cycle as well as the parking area lines that are not detected in this cycle due to objects such as a shadow but are additionally registered from the tracking target lines that have been previously detected. The parking frame setting portion 116 temporarily stores the information of the set parking frame (coordinate values of four endpoints of parking frame) in the temporary storage portion 123 or the like.

In Step S10 (angle parking frame determination step), the angle parking frame determination portion 118 determines whether the parking frame set in Step S9 is the angle parking frame or not by the above procedures. Then, the program proceeds to Step S11, and the parking frame setting portion 116 registers the information of the parking frame (parking space) set in Step S9 as the parking frame registration data 121 in the memory 120. Specifically, the parking frame setting portion 116 registers, in the memory 120, the coordinate values of the endpoints of the line segments of the positive and negative edges that face each other to constitute the parking frame as the coordinate values of the start point or finish point of the parking frame. In the case that the parking frames are determined as the angle parking frames in Step S10, the parking frame setting portion 116 adds the information (e.g., angle) of the angle parking frame to the parking frame registration data 121 and registers the information. In the case that some of the parking frames are not determined as the angle parking frames, the parking frame setting portion 116 does not register these parking frames since the angle parking frames may not be properly determined.

In addition, information necessary for the automatic parking process may be added to the parking frame registration data 121. Also, the display control portion 119 may transmit to the navigation device 30 the control signal for superimposing the parking frame image on the overhead image G and displaying the superimposed image. Thereby, the driver can see the parking frame on the monitor 31 and properly choose the parking frame to park the vehicle. Further, even if the parking frame is hidden by the other vehicle or the like and the driver cannot directly see the parking frame, for example, such a parking frame can be displayed on the overhead image G and set as the parking target. Thereby, the parking assist performance can be improved.

The operations of the image processor will be described in detail with reference to FIG. 6 to FIG. 9. First, at the detection timing shown in FIG. 6, the overhead image G is displayed on the monitor 31 in response to the signal obtained by synthesizing the image signals from the camera 20 in Step S1 and S2. By executing the processes in Step S3 to S5, the parking area line K1 and the parking area line K3 are detected. The parking area line K1 consists of a pair of the positive edge line segment Ep1 and the negative edge line segment Em1 (simply referred to as "pair of edges Ep1, Em1", etc. hereinafter). The parking area line K3 consists of a pair of the positive edge line segment Ep3 and the negative edge line segment Em3. However, the parking area line K2 is not detected as the parking area line since a part of the parking area line K2 is hidden by the other vehicle V1.

The parking area lines K1 and K3 are determined as the tracking target lines by the process in Step S6 and stored in the temporary storage portion 123 as the tracking information data 125. Then, the program proceeds to the determination of similarity and coincidence in Step S7. The parking area lines K1 and K3 are detected as the parking area lines and also extracted as the tracking target lines. Accordingly, the parking area lines and the tracking target lines are determined as having similarity and coincidence, and the detection numbers for the parking area lines K1 and K3 are counted up to one. Then, the program proceeds to the additional determination of the tracking information in Step S8. The parking area lines K1 and K3 have been detected in this cycle. Accordingly, the parking area lines K1 and K3 are not additionally registered as the parking area lines, which avoids the duplicate registration. On the other hand, the parking area line K2 has not been detected, and accordingly, the parking frames A1 and A2 are not detected in Step S9. Therefore, the angle parking frame is not determined in Step S10, and the parking frame is not registered in Step S11.

At the detection timing when the overhead image G shown in FIG. 7 is acquired in accordance with the movement of the vehicle V, the parking area line K2 consisting of the pair of the edges Ep2 and Em2, and the parking area line K3 consisting of the pair of the edges Ep3 and Em3 are detected. Also, the parking area lines K2, K3 are determined as the tracking target lines and stored in the temporary storage portion 123 as the tracking information data 125. On the other hand, the parking area line K1 hidden by the other vehicle V1 is not detected as the parking area line and not determined as the tracking target line. In the similarity and coincidence determination of Step S7, the tracking target lines corresponding to the parking area lines K2 and K3 are determined as having similarity and coincidence, and the detection numbers for the parking area lines K2 and K3 are counted up (to one for parking area line K2 and two for parking area line K3). The parking area line K1 is not detected in this cycle and does not have the similarity and coincidence, so that the detection number is not counted up (remains one).

Then, in the additional determination of Step S8, the parking area line K1 is not determined as the parking area line in this cycle and the detection number is equal to or more than the predetermined number (once). Accordingly, the tracking target line corresponding to the parking area line K1 is additionally registered as the parking area line K1 in the temporary storage portion 123. On the other hand, the parking area line K2 and K3 have been detected as the parking area lines in this cycle, so that the tracking target lines corresponding to the parking area line K2 and K3 are not registered. Thereby, the duplicate registration can be avoided. The parking area line K1 is added as the parking area line if the parking area line K1 is not detected in this cycle. Therefore, the parking frames A1 and A2 can be set in Step S9 based on the parking area lines K1, K2, and K3.

Figure 8:
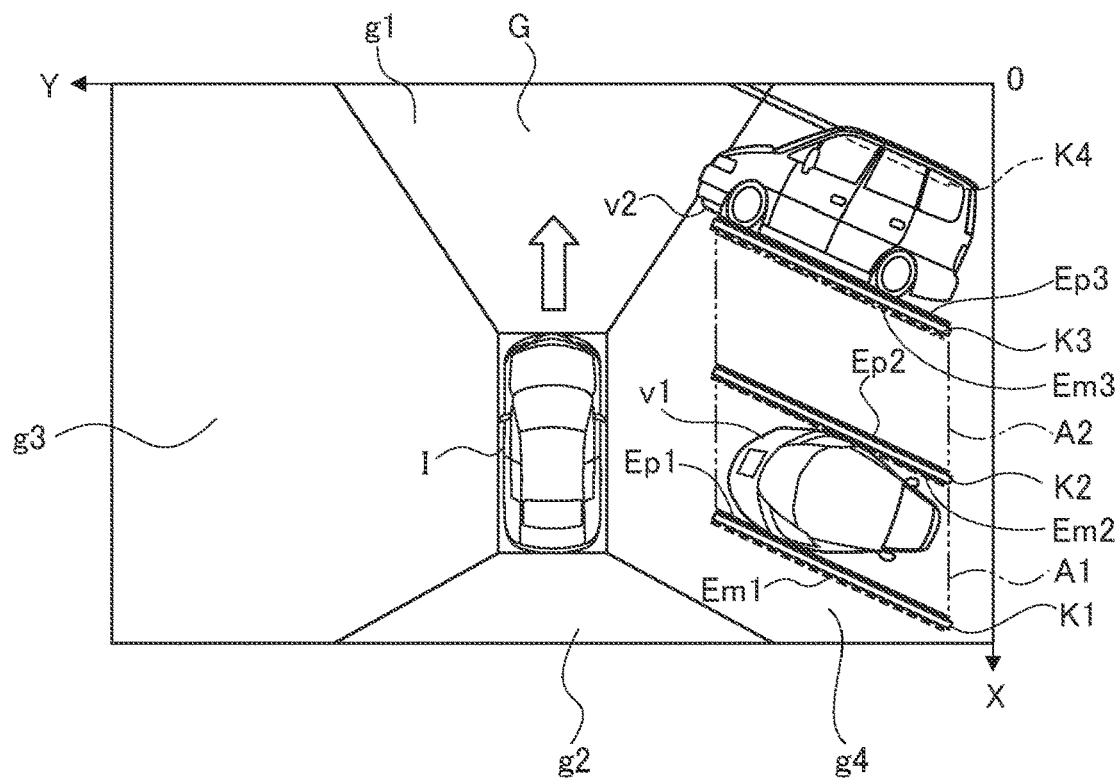
FIG. 8 is a view illustrating an example of the operation of the image processor according to the embodiment to schematically show the detected edges and the parking frames on the overhead image acquired at a timing different from ones in FIGS. 6 and 7 because of the movement of the vehicle.

Similarly, at the detection timing shown in FIG. 8, the parking area lines K1, K2, and K3, which consist of the pair of edges Ep1, Em1, the pair of edges Ep2, Em2, and the pair of edges Ep3, Em3, respectively, are detected as the parking area lines and determined as the tracking target lines. On the other hand, the parking area line K4 is not detected as the parking area line and is not determined as the tracking target line since the parking area line K4 is hidden by the other vehicle V2. The detection numbers for the parking area lines K1 and K2 are counted up to two while the detection number for the parking area line K3 is counted up to three. The parking area lines K1, K2, and K3 have been detected in this cycle. Accordingly, the parking area lines K1, K2, and K3 are not registered as the parking area lines. Therefore, the parking frames A1 and A2 are set in accordance with the parking area lines K1, K2, and K3.

Figure 9:
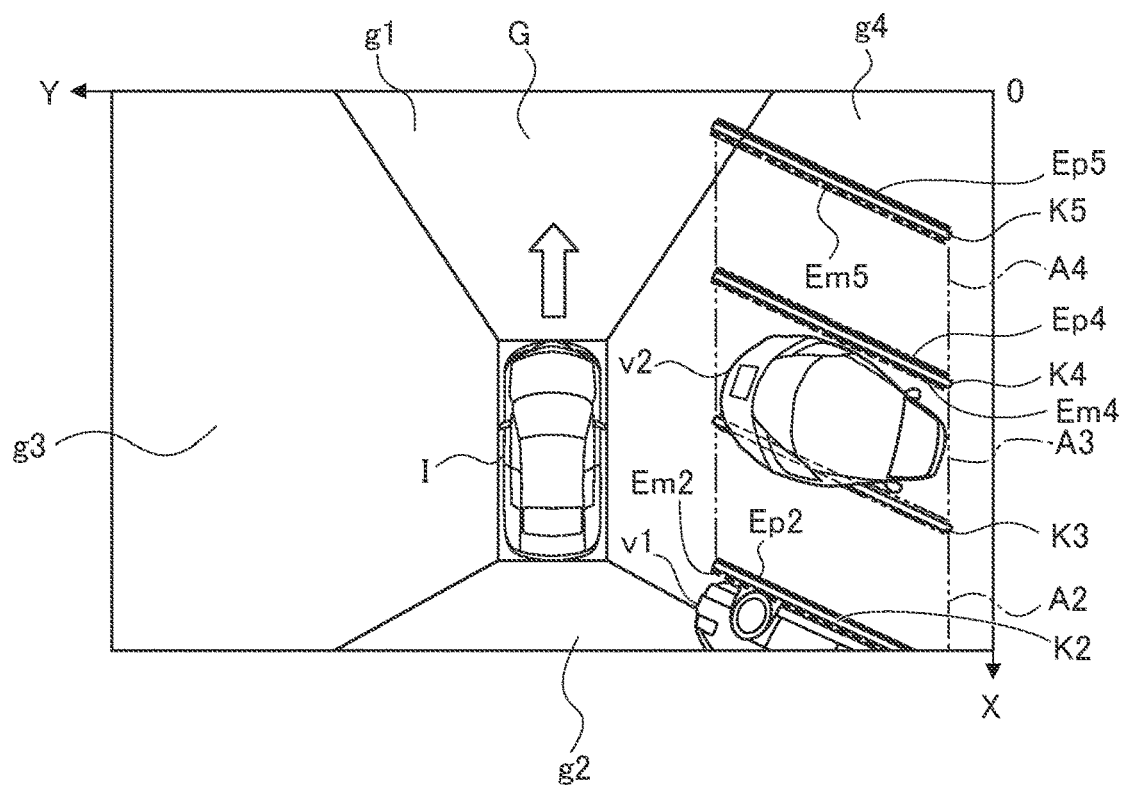
FIG. 9 is a view illustrating an example of the operation of the tracking determination portion to schematically show the detected edges and the parking frames on the overhead image acquired at a timing different from ones in FIG. 6 to FIG. 8 because of the movement of the vehicle.

At the timing shown in FIG. 9 in accordance with the further movement of the vehicle V, the parking area line K2, K4, and K5, which consist of the pair of edges Ep2, Em2, the pair of edges Ep4, Em4, and the pair of edges Ep5, Em5, respectively, are detected as the parking area lines and determined as the tracking target lines. On the other hand, the parking area line K3 is hidden by the other vehicle V2. Accordingly, the parking area line K3 is not detected as the parking area line and is not determined as the tracking target line. The parking area lines K1 and K3 are not detected in this cycle and do not have the similarity and coincidence. Accordingly, the detection numbers for the parking area lines K1 and K3 are not counted up. In the next additional determination, the parking area lines K1 and K3 are additionally registered as the parking area lines since the parking area lines K1 and K3 are not detected in this cycle and the detection numbers are equal to or more than the predetermined number. On the other hand, the parking area lines K2, K4, and K5 are detected as the parking area lines and determined as the tracking target lines. Accordingly, the parking area lines K2, K4, and K5 have the similarity and coincidence and the detection numbers for these parking area lines are counted up. However, the parking area lines K2, K4, and K5 are detected as the parking area lines in this cycle and are not subject to addition. Therefore, the parking frames A2, A3, and A4 are set based on the parking area line K2, K3, K4, and K5. The parking area line K1 has been disappeared from the overhead image G but has been additionally registered as the parking area line. Accordingly, the parking frame A1 is also set between the parking area lines K1 and K2 in the program.

In the image processor 100 of the present embodiment configured as above, the line extraction portion 111 extracts, at the predetermined timing, the line from the overhead image G based on the image signal output from the camera 20 that captures the surroundings of the vehicle V. The parking area line detection portion 112 detects the parking area line K based on the line extracted by the line extraction portion 111. The tracking determination portion 113 determines whether the line extracted by the line extraction portion 111 fulfills the predetermined conditions or not. The comparing portion 114 compares the line determined by the tracking determination portion 113 as fulfilling the predetermined conditions with the line extracted by the line extraction portion 111 from the overhead image G in accordance with the image signal captured at the predetermined timing in the past to determine the degrees of similarity and coincidence thereof. Based on the result of the comparison by the comparing portion 114, the parking area line determination portion 115 determines the line whose degrees of similarity and coincidence is equal to or more than the given value as the parking area line. The parking frame setting portion 116 set the parking frame by using the lines determined as the parking area lines by the parking area line determination portion 115.

Accordingly, even if there is a line that is not determined as the parking area line K that constitutes the parking frame because of the non-detection or false detection depending on the detection timing due to shadows, light reflection, parked vehicles, obstacles, or the like, the parking frame, which conventionally could not be detected, can be properly detected by keeping storing the line in the memory 120 as the tracking target line, tracking and using this tracking target line. As a result, it is possible to provide the image processor 100 and the image processing method capable of detecting the parking frames with high accuracy.

With the image processor 100 and the image processing method, the parking assist device and the parking assist method capable of detecting the parking frame with high accuracy can be provided.

Further, the present embodiment includes the vehicle speed acquisition portion 117 that acquires the speed of the vehicle V. In the case that the vehicle speed acquired by the vehicle speed acquisition portion 117 is less than the predetermined speed, the comparing portion 114 does not perform the determination of coincidence. Thereby, the determination with regard to the tracking information can be performed with higher speed and accuracy. As a result, the parking area lines and the parking frames can be detected with higher speed and accuracy.

Also, the present embodiment includes the angle parking frame determination portion 118 that determines whether the parking frame set by the parking frame setting portion 116 is an angle parking frame or not. Thereby, the angle parking frame can be detected and the parking assist operation to the angle parking frame can be smoothly performed. Further, in the present embodiment, the parking area line hidden by the obstacle, the shadow, or the like can be detected by tracking this line, so that the detection of the parking area lines and the parking frame can be performed with high accuracy. Thereby, the amount of information used by the angle parking frame determination portion 118 to determine the angle parking frame increases. As a result, the determination accuracy of the angle parking frames can be improved.

Moreover, the present embodiment includes the display control portion 119 that controls the monitor 31 to superimpose the parking frame image that shows the parking frame set by the parking frame setting portion 116 on the overhead image G and to display the superimposed image. Thereby, the driver can see the parking frame on the monitor 31 and the parking assist operation can be performed more smoothly.

Furthermore, in the present embodiment, the line extraction portion 111 scans the overhead image G in the predetermined direction, detects pixels whose luminance or color parameters in the image signal vary more than the threshold, detects as edges portions where the arrangement of the detected pixels is equal to or longer than the given length and extracts the line in accordance with the edges. Thereby, the parking area lines and the tracking target line can be detected with high accuracy.

The embodiment of the present disclosure has been described in detail with reference to the drawings. However, the above embodiment is only an example of the present disclosure. The embodiment may be modified and/or applied without departing from the spirit of the present disclosure.

For example, in the image processor 100 of the embodiment, the edges are detected based on the intensity and the direction (positive direction or negative direction) of the change in the color parameters (for example, RGB, RGBA) and the brightness of the image. However, the embodiment is not limited thereto, and the edges may be detected based on the intensity and direction of the change in other information included in the image signal.

Also, in the image processor 100 of the present embodiment, it is assumed that the parking lot P includes the angle parking frames. However, the parking frames are not limited to the angle parking frames. The present disclosure can be applied to the perpendicular or side-by-side parking frame that extends substantially perpendicular to the vehicle V and the parallel parking frame that extends substantially parallel to the vehicle V by changing the width of the parking frame, the angles of the parking area lines, or the like in the parameter data 122. Thereby, even if the parking frame is hidden by the shadow or the like, the parking frame can be detected with high accuracy by preventing the non-detection and false detection.

What is claimed is:

1. An image processor comprising:
   a processor; and
   a non-transitory computer-readable medium having stored thereon executable instructions that, when executed by the processor, cause the image processor to function as:
   a line extraction portion that is configured to extract: (i) a first line from a first image generated from a first surrounding image of a vehicle captured by an imaging device at a first predetermined timing; and (ii) a second line from a second image generated from a second surrounding image of the vehicle captured by the imaging device at a second predetermined timing which is after the first predetermined timing;
   a tracking determination portion that is configured to determine whether the second line extracted by the line extraction portion fulfills a predetermined condition or not;
   a comparing portion that is configured to compare the second line that is determined as fulfilling the predetermined condition by the tracking determination portion with the first line to obtain degrees of similarity and coincidence thereof, the degrees of similarity and coincidence being based on an angle difference and a distance difference between the first line and the second line;
   a parking area line determination portion that is configured to determine the second line as a parking area line when the degrees of similarity and coincidence that are obtained are equal to or more than a given value;
   a parking frame setting portion that is configured to set a parking frame using the second line that is determined as the parking area line by the parking area line determination portion; and
   a vehicle speed acquisition portion that is configured to acquire a speed of the vehicle,
   wherein the comparing portion is configured to not obtain the degree of coincidence when the speed of the vehicle acquired by the vehicle speed acquisition portion is equal to or less than a predetermined speed.

2. The image processor according to claim 1, wherein the executable instructions, when executed by the processor, cause the image processor to further function as an angle parking frame determination portion that is configured to determine whether the parking frame set by the parking frame setting portion is an angle parking frame or not.

3. The image processor according to claim 1, wherein the executable instructions, when executed by the processor, cause the image processor to further function as a display control portion that is configured to control a display portion to superimpose a parking frame image on the second image generated from the second surrounding image of the vehicle to create a superimposed image and display the superimposed image, the parking frame image showing the parking frame set by the parking frame setting portion.

4. The image processor according to claim 1, wherein the line extraction portion is further configured to:
   scan the second image generated from the second surrounding image of the vehicle in a predetermined direction;
   detect pixels whose luminance or color parameter in an image signal of the second image generated from the second surrounding image of the vehicle vary more than a threshold;
   detect a portion where an arrangement of the pixels that have been detected is equal to or longer than a given length as an edge; and
   extract the second line in accordance with the edge.

5. An image processing method comprising:
   extracting a second line from a second image generated from a second surrounding image of a vehicle captured by an imaging device at a second predetermined timing;
   determining whether the second line fulfills a predetermined condition or not;
   comparing the second line that is determined as fulfilling the predetermined condition with a first line that is extracted from a first image generated from a first surrounding image of the vehicle captured by the imaging device at a first predetermined timing that has passed to obtain degrees of similarity and coincidence thereof, the degrees of similarity and coincidence being based on an angle difference and a distance difference between the first line and the second line;
   determining the second line as a parking area line when the degrees of similarity and coincidence that are obtained are equal to or more than a given value;
   setting a parking frame using the second line that is determined as the parking area line; and
   acquiring a speed of the vehicle,
   wherein the degree of coincidence is not obtained when the speed of the vehicle which is acquired is equal to or less than a predetermined speed.

* * * * *